US007640787B2

(12) United States Patent
Curtis et al.

(10) Patent No.: US 7,640,787 B2
(45) Date of Patent: Jan. 5, 2010

(54) PIPETTE VERIFICATION DEVICE AND PIPETTE

(75) Inventors: Richard Curtis, Gorham, ME (US); David Bohnsack, New Gloucester, ME (US); Marc Boillat, Auvernier (CH)

(73) Assignees: Seyonic S.A., Neuchatel (CH); Artel Inc., Westbrook, ME (US)

( * ) Notice: Subject to any disclaimer, the term of this patent is extended or adjusted under 35 U.S.C. 154(b) by 316 days.

(21) Appl. No.: 10/588,553

(22) PCT Filed: Feb. 6, 2004

(86) PCT No.: PCT/US2004/003824

§ 371 (c)(1),
(2), (4) Date: Aug. 7, 2006

(87) PCT Pub. No.: WO2005/085775

PCT Pub. Date: Sep. 15, 2005

(65) Prior Publication Data

US 2007/0056351 A1    Mar. 15, 2007

(51) Int. Cl.
*G01F 25/00* (2006.01)
(52) U.S. Cl. ..................... 73/1.74; 73/864.13
(58) Field of Classification Search .............. 73/864.01, 73/864.11, 864.13, 1.74, 38, 863
See application file for complete search history.

(56) References Cited

U.S. PATENT DOCUMENTS

| 4,779,467 | A |  | 10/1988 | Rainin et al. .............. 73/864.17 |
| 4,780,833 | A |  | 10/1988 | Atake ........................ 700/281 |
| 4,790,176 | A |  | 12/1988 | Marteau d'Autry .......... 73/1.74 |
| 4,976,161 | A |  | 12/1990 | Czernecki et al. ......... 73/864.17 |
| 5,456,879 | A |  | 10/1995 | Suovaniemi ................ 422/100 |
| 5,750,881 | A | * | 5/1998 | Dorenkott et al. ............... 73/37 |
| 5,857,893 | A | * | 1/1999 | Olsen et al. ..................... 451/5 |
| 5,983,733 | A |  | 11/1999 | Strandberg et al. ....... 73/864.11 |
| 5,998,218 | A |  | 12/1999 | Conley et al. ............... 436/180 |
| 6,060,320 | A | * | 5/2000 | Dorenkott et al. ............. 436/54 |
| 6,170,343 | B1 |  | 1/2001 | Conley et al. ............. 73/864.18 |
| 6,254,832 | B1 |  | 7/2001 | Rainin et al. ................ 422/100 |
| 6,553,824 | B1 |  | 4/2003 | Lutze .......................... 73/149 |
| 2003/0019305 | A1 | * | 1/2003 | Richter et al. ............ 73/864.11 |
| 2004/0020938 | A1 | * | 2/2004 | Boillat et al. ................. 222/61 |

FOREIGN PATENT DOCUMENTS

WO    WO 02/071001    9/2002

OTHER PUBLICATIONS

PCT International Search Report, for PCT/US2004/003824, mailed Jan. 27, 2005 (2 pages).

* cited by examiner

*Primary Examiner*—Hezron Williams
*Assistant Examiner*—Tamiko D Bellamy
(74) *Attorney, Agent, or Firm*—Finnegan, Henderson, Farabow, Garrett & Dunner, LLP

(57) ABSTRACT

Pipettes, widely used in clinical and pharmaceutical laboratories to transfer small volumes of liquid, may be subject to hidden performance degradation and operator error. Pipette performance cannot be accepted without monitoring. The present disclosure concerns a verification device for a pipette with a piston for aspirating then dispensing, using a shaft, a determined volume of liquid. This device may include: a first assembly for supplying a displaced volume measurement, comparing this measurement to a desired value and generating an indication of the difference between the measured volume and the desired value; and a second assembly, responding to the first assembly, for delivering information relating to the indication.

22 Claims, 2 Drawing Sheets

PIPETTE VERIFICATION DEVICE AND PIPETTE

This application is a national stage filing under 35 U.S.C. § 371 of International Application No. PCT/US2004/003824, filed on Feb. 6, 2004, the disclosure of which is expressly incorporated herein by reference to its entirety.

TECHNICAL FIELD

The present disclosure relates to liquid dispensing systems capable of delivering, with great precision, very small volumes, typically from 1 nanoliter to several milliliters.

The present disclosure concerns, more particularly, a pipette verification device and a pipette fitted with the same.

BACKGROUND

The pipettes currently available on the market, often called micropipettes, are syringes including a cylinder extended by a shaft and a dispensing tip and a piston sliding in the cylinder. This piston can be actuated, manually or by a motor, over a travel determined by the operator using a suitable counter.

During operation, the piston is pushed down to its end position, the dispensing tip mounted at the end of the shaft is dipped into the liquid to be sampled, then the piston is moved up by a distance corresponding to the volume of liquid displayed on the counter. The upward movement of the piston causes the desired volume of liquid to be aspirated only into the tip, the liquid being then able, via another downward movement of the piston, to be discharged into a target reserved therefore.

Pipettes of this type, both manual and motorized, are disclosed, for example, in U.S. Pat. Nos. 5,983,733, 6,170,343 and 6,254,832. Multishaft pipettes are also disclosed, for example, in U.S. Pat. Nos. 4,779,467 and 5,456,879.

According to the requirements of the "Good Laboratory and Manufacturing Processes" applied to pipettes, monitoring and recording measures should be taken regarding the volume of liquid dispensed. Malfunction of a pipette means that all the tests carried out with the instrument may have to be reconsidered, which constitutes an expensive operation.

Moreover, the quality of a pipette's performance may necessarily fall off over time. After a certain number of operations, each pipette may have to undergo a preventive maintenance procedure. Operators thus have not only to determine after how many pipetting operations such maintenance has to be carried out, but may also keep pipette calibration records.

Finally, account may have to be taken of the fact that the accuracy of the pipette also depends on the operator, who may be more or less skilled and who determines the temperature of the instrument, which influences the volume of aspirated air.

SUMMARY OF THE INVENTION

It is an object of the present disclosure to meet the quality control requirements that have just been mentioned.

More precisely, the present disclosure relates to a verification device for a pipette with a piston for aspirating then dispensing, using a shaft, a determined volume of liquid. This device may include:

first means for supplying a displaced volume measurement, comparing this measurement to a desired value and generating an indication of the difference between the measured volume and the desired value; and second means, responding to the first means, for delivering an information relating to the indication.

The device defined hereinbefore may also include one or more of the following main features:

the first means may include a sensor capable of supplying a pressure measurement at two points of the shaft, and a microprocessor programmed to calculate, from this measurement, the volume displaced in the shaft, to verify that this volume corresponds to the desired volume value and to generate an indication relating to the verification;

the sensor may be capable of supplying, in addition, a measurement of the temperature in the shaft;

the second means may include a display and, preferably, an acoustic alarm;

the second means may include a transceiver capable of making the microprocessor communicate with a control and recording unit;

the microprocessor may be programmed to store instructions that are sent thereto by the unit and to send thereto information concerning the difference between the measured volume and the desired value;

if the device is intended for a pipette whose piston is actuated by a motor, the microprocessor may be programmed to control the motor such that the aspirated volume corresponds to the desired value;

the device may be a module that can be fitted to an existing pipette.

The present disclosure also relates to a pipette integrating a verification device as previously defined.

The present disclosure further relates to a control and recording unit for managing a plurality of pipettes fitted with the verification device disclosed hereinbefore. This unit may include a computer that can be reduced, more simply, to a microprocessor device dedicated to this function, and a transceiver capable of making the computer communicate with the transceiver of each of the pipettes.

Advantageously, the computer of this unit may be programmed such that the following operations are carried out:

sending the protocol of the pipetting operations to be carried out to each pipette;

recording the performance of each pipette;

recording the performance of the operator; and guiding the operator during a series of pipetting operations.

Other features and advantages of the present disclosure will appear from the following description, made with reference to the annexed drawings, in which.

Figures 1, 3:
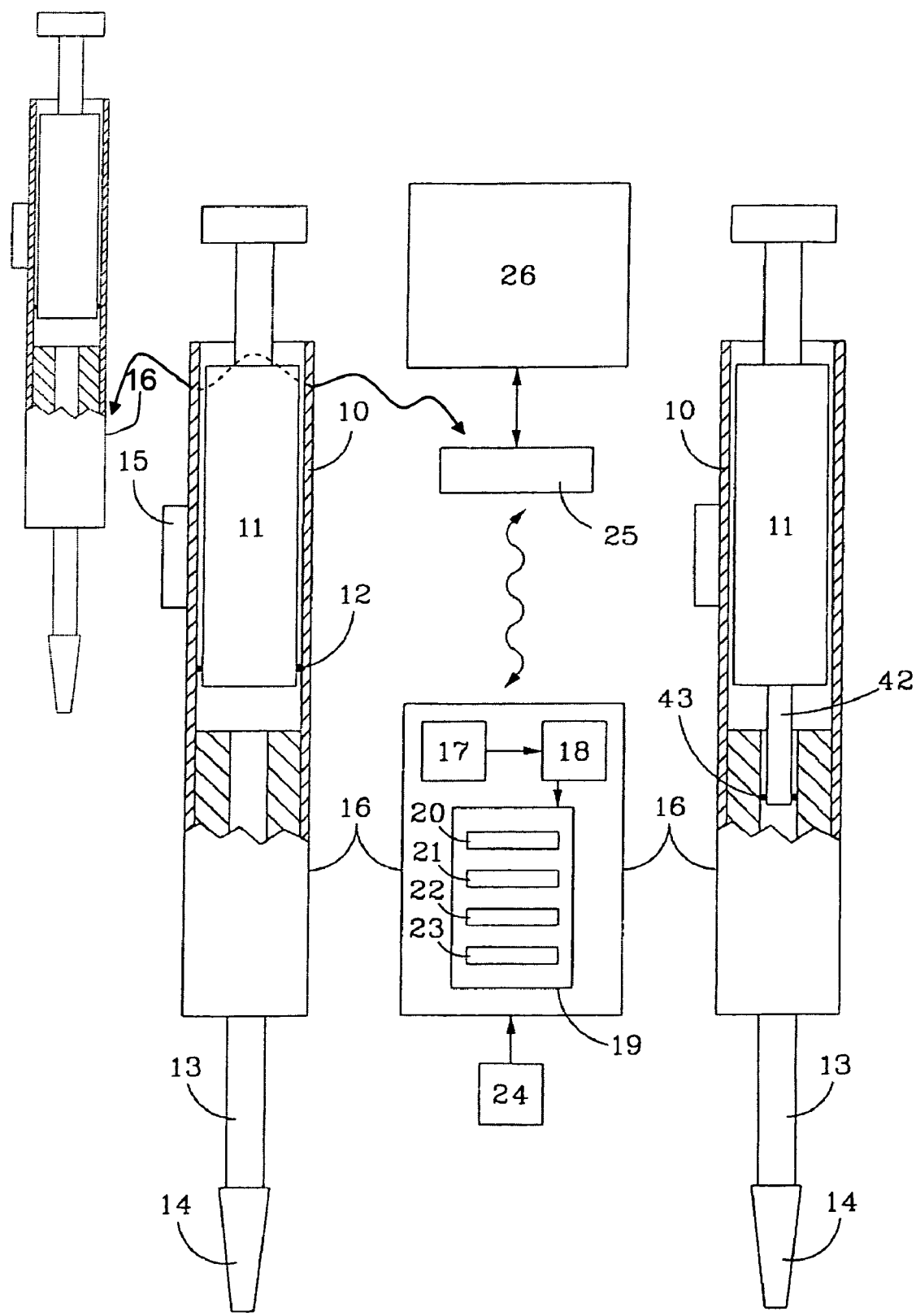
FIG. 1 is a schematic diagram of an exemplary pipette according to one aspect of the present disclosure, and the control and recording unit to which it is connected.
FIG. 3 illustrates an alternative embodiment of the mechanical part of the pipette of FIG. 1, according to yet another aspect of the present disclosure.

The pipette shown in FIG. 1 may include a cylindrical chamber 10 into which a manually actuated piston 11 can slide. A seal 12 may seal the contact between cylinder 10 and piston 11. Cylinder 10 may be extended, at its base, by a shaft 13, whose end may be provided with a removable conical dispensing tip 14. The shaft 13 may contain a working fluid, which may include air, but which may also include a liquid. Finally, a counter 15 may allow the operator to determine the volume of liquid to be dispensed. The travel of piston 11 will thus be automatically determined to follow this instruction.

Piston 11 can also be actuated by a motor, which replaces the action exerted manually by the operator.

The peculiarity of this pipette lies in the fact that it may be provided with a verification module 16, which, in the example shown, occupies the extension of cylinder 10 and may include:

- a sensor 17 for supplying a pressure measurement of the working fluid at two points of shaft 13 and a measurement of its temperature;
- a microprocessor 18 supplying, from the measurements, an indication of the volume of liquid aspirated into—or dispensed by tip 14, verifying that this volume corresponds to the desired volume and generating an indication relating to the verification;
- a communication interface 19 with the operator, which includes an LCD display 20, an acoustic alarm 21, a control button 22 and a transceiver 23; and
- a battery or accumulator 24 used to supply electric power to the module.

Sensor 17 may include two chambers inserted in series, via a fluid restrictor, on the path of the fluid that flows into the shaft and provided with an elastically deformable wall. Two electromechanical transducers respectively associated with the elastic wall of each chamber may supply an electric signal representative of the pressure prevailing therein. A temperature sensor may be arranged in proximity to the restrictor. This device may be implemented in accordance with that disclosed in document WO 02/071001 to which reference can be made for a complete description.

Finally, transceiver 23 may communicate, at short distance, outside the pipette, with another transceiver 25 associated with a computer 26, which form a central control and recording unit capable of managing a plurality of pipettes. The word "computer" used in the present document can also designate any microprocessor device dedicated to the unit. The communication function between the pipettes and the central unit may be achieved by any appropriate means known to those skilled in the art, such as hard-wired, infrared or radio (IEEE 802.15 or Bluetooth) transmissions.

According to one aspect of the present disclosure, verification module 16 can either form an integral part of the pipette, or be added to a conventional existing pipette. In the first case, only sensor 17 has to be placed along shaft 13, the other components being able to be incorporated in the body of the pipette and interconnected by any means available to those skilled in the art. In the second case, module 16 can either be inserted between the end of shaft 13 and its tip 14, or be incorporated in an assembly linking together piston 11 and shaft 13.

Figure 2:
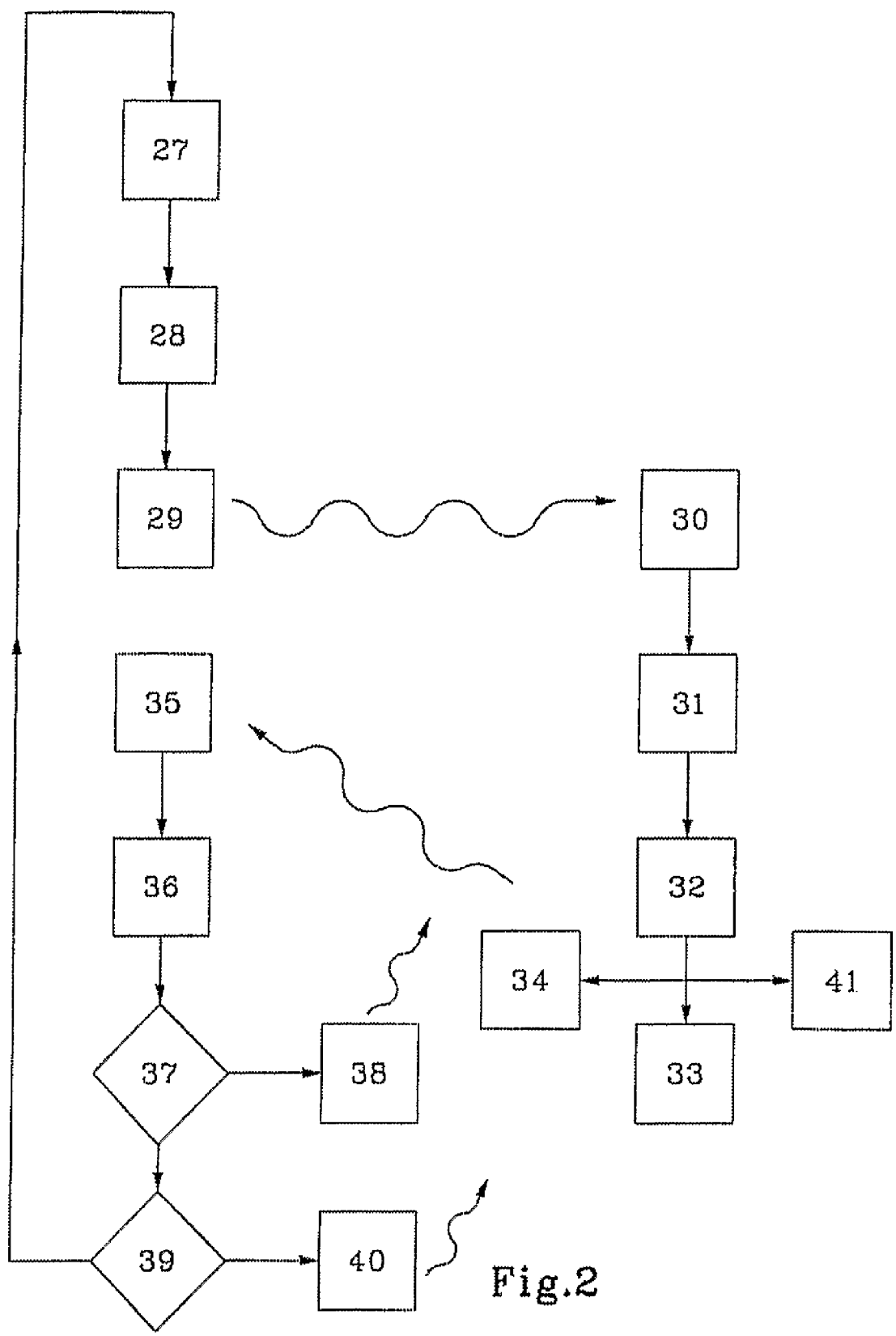
FIG. 2 shows exemplary programming logic of the pipette and the unit according to another aspect of the present disclosure.

Reference will now be made to FIG. 2, which describes the main operations carried out by microprocessor 18 of the pipette (on the right) and the external computer 26 (on the left).

When the operator wishes to carry out a series of liquid sampling and deposits, he may begin, at 27, on computer 26, by identifying himself and indicating the time and date of his intervention, then by specifying, for example, the following parameters:

- the type and identification number of the pipette;
- the dispensing protocol: number and volume of deposits to be carried out;
- the accepted tolerances.

Fewer parameters or more parameters may, of course, be specified.

Once the identified pipette has been switched on using control button 22, the command can be given, at 28, to start operations. Computer 26 may then send the necessary instructions to the pipette, at 29.

These instructions may be received, at 30, by microprocessor 18 of the pipette, which may then be ready to operate.

After having adjusted counter 15 to the value of the volume to be dispensed, the operator then may take a sample of the liquid, which takes place, by aspiration, in tip 14 of the pipette.

During this operation, microprocessor 18 may receive from sensor 17 signals representative of the temperature and pressures in its two chambers. These three items of information allow it to calculate, at 31, the fluid flow rate into shaft 13, then, by integration, the volume of liquid aspirated into its tip 14.

The next operations may include, at 32, comparison of the measured volume with the desired value received from the computer, then, at 33, display on LCD 20 of a message indicating that the aspirated volume is—or is not—within the imposed tolerance limits.

If the desired value has been respected, the operator can then actuate his pipette to eject the liquid into the target intended therefore. If, conversely, the desired value has not been respected, acoustic alarm 21 may be actuated.

Microprocessor 18 may also send to the computer, at 34, the result of the comparison, which may be received at 35 then processed, at 36, so as to carry out a quality check in accordance with the rules of the "Good Laboratory and Manufacturing Processes".

Typically, the information elaborated and stored at 36 by computer 26 for a determined pipette are as follows (non exhaustive list):

- respect for the tolerances for each aspirated volume;
- standard deviation for a set of operations;
- variation coefficient for a set of operations;
- number of operations since the last maintenance service;
- number of operations until the next maintenance service;
- measured temperature for each operation;
- calibration history;
- percentage of failures;
- percentage of failures for identified operator;
- percentage of minor failures (slight limit violation requiring calibration)
- percentage of major failures (large limit violation due to premature removal of the tip during suction or obstruction of the tip, other pipetting failure).

The next operation, at 7, may be to determine whether the operation is a success or failure.

In the event of a failure, computer 26 may send the pipette, at 38, the command, received at 30, to remedy the defect that caused the failure and to take another sample of liquid.

When the operation has been successful, computer 26 may determine, at 39, whether the operations defined in the protocol have finished.

If this is not the case, computer 26 may send the pipette, at 40, the command, received at 30, to continue operations. If, conversely, the protocol has finished, the computer may return to 27 to begin a new series of liquid sampling and deposits.

In the case of a pipette whose piston is driven by an actuator, such as a motor, the pipette microprocessor 18 may optionally use the result of its comparison 32 between the measured volume and the desired value to carry out, at 41, enslavement of the actuator which may drive the piston such that its travel allows the volume of liquid imposed by the desired value to be aspirated.

Reference will be made, in conclusion, to the alternative embodiment of FIG. 3 in which those elements common to those of FIG. 1 are designated by the same reference numerals. In this case, piston 11 may be extended by a portion of smaller diameter 42, which may slide into the upper part of shaft 13. Sealing may then be achieved via a seal 43. This variant may give the pipette greater sensitivity to the movements of the piston.

Thus, there is proposed an intelligent pipette design, provided with a device for verifying its operations and benefiting from the assistance of a central unit that controls and monitors it. All of the requirements of a modern and efficient quality system are thus satisfied.

Needless to mention that the design of the invention can apply both to single shaft pipettes and multiple shaft pipettes.

What is claimed is:

1. A method for verifying the volume of liquid displaced in a pipette, which includes a piston and a shaft and which is intended to aspirate then dispense the volume of liquid, comprising the following steps:
    defining a predetermined value for the volume to be aspirated;
    measuring at a plurality of times during the aspiration the pressure at two points of the shaft;
    calculating by integration from the measured pressure the volume of liquid displaced in the shaft;
    verifying if the calculated volume corresponds to the predetermined value; and
    generating an indication relating to this verification.

2. The method according to claim 1 intended to be applied to a pipette whose piston is driven by an actuator, further comprising the steps of:
    calculating the difference between the calculated volume and the predetermined value; and
    transmitting a signal to the actuator in order to make it drive the piston such that the volume aspirated corresponds to the predetermined value.

3. A verification device for a pipette for aspirating then dispensing a determined volume of liquid, the pipette including a piston and a shaft, wherein the device includes:
    a sensor capable of supplying a pressure measurement at two points of the shaft at a plurality of times during the aspiration of liquid; and
    a microprocessor programmed to calculate by integration, from said measurements as they vary throughout the aspiration, the volume of liquid aspirated in the shaft, to verify that this volume corresponds to the volume of the desired value and generate an indication relating to this verification; and
    means, responding to the microprocessor, for delivering information relating to the indication.

4. A device according to claim 3, wherein the sensor is further capable of supplying a temperature measurement in the shaft.

5. A device according to claim 3, wherein the means for delivering information includes a display.

6. A device according to claim 3, wherein the means for delivering information includes an acoustic alarm.

7. A device according to claim 3 wherein the means for delivering information further includes a transceiver capable of making the microprocessor communicate with a control and recording unit.

8. A device according to claim 4 wherein the means for delivering information includes a transceiver capable of making the microprocessor communicate with a control and recording unit.

9. A device according to claim 5 wherein the means for delivering information includes a transceiver capable of making the microprocessor communicate with a control and recording unit.

10. A device according to claim 6 wherein the means for delivering information includes a transceiver capable of making the microprocessor communicate with a control and recording unit.

11. A device according to claim 7, wherein the microprocessor is programmed to store instructions which are sent thereto by the control and recording unit.

12. A device according to claim 11, wherein the microprocessor is programmed such that the transceiver sends to the control and recording unit an item of information concerning the difference between the measured volume and the desired value.

13. A device according to claim 3, intended for a pipette whose piston is driven by an actuator, wherein the microprocessor is programmed to control the actuator such that the aspirated volume corresponds to the desired value.

14. A device according to claim 3, wherein the device forms a module that can be fitted to an existing pipette.

15. A device according to claim 4, wherein the device forms a module that can be fitted to an existing pipette.

16. A pipette with a piston for aspirating then dispensing, using a shaft, a determined volume of liquid, wherein the device includes a verification device according to claim 3.

17. A pipette with a piston for aspirating then dispensing, using a shaft, a determined volume of liquid, wherein the device includes a verification device according to claim 4.

18. A pipette with a piston for aspirating then dispensing, using a shaft, a determined volume of liquid, wherein the device includes a verification device according to claim 7.

19. A control and recording unit for managing a plurality of pipettes each fitted with the verification device according to claim 9, wherein the control and recording unit includes a computer and a transceiver capable of making the computer communicate with the transceiver of each of the pipettes.

20. A control and recording unit according to claim 19, wherein the computer is programmed such that the following operations are carried out:
    sending the protocol of the pipetting operations to be carried out to each pipette;
    recording the performance of the pipette; and
    recording the operator's performance.

21. A control and recording unit according to claim 19, wherein the computer is programmed so as to send the number and volume of deposits to be carried out by each pipette and the accepted tolerances.

22. A control and recording unit according to claim 20, wherein the computer is programmed so as to send the number and volume of deposits to be carried out by each pipette and the accepted tolerances.

* * * * *